(12) United States Patent
Wolf et al.

(10) Patent No.: US 7,616,814 B2
(45) Date of Patent: Nov. 10, 2009

(54) DETERMINING PIXELS TEXTUAL CHARACTERISTICS

(75) Inventors: Christian Wolf, Villeurbanne (FR); Jean-Michel Jolion, Villeurbanne (FR); Christophe Laurent, Vignoc (FR)

(73) Assignee: France Telecom, Paris (FR)

( * ) Notice: Subject to any disclaimer, the term of this patent is extended or adjusted under 35 U.S.C. 154(b) by 849 days.

(21) Appl. No.: 10/961,403

(22) Filed: Oct. 12, 2004

(65) Prior Publication Data

US 2005/0123198 A1 Jun. 9, 2005

(30) Foreign Application Priority Data

Oct. 10, 2003 (FR) .................. 03 11918

(51) Int. Cl.
- *G06K 9/34* (2006.01)
- *H04N 1/40* (2006.01)

(52) U.S. Cl. .................. 382/176; 358/462
(58) Field of Classification Search .......... 382/176; 358/462

See application file for complete search history.

(56) References Cited

U.S. PATENT DOCUMENTS

| | | | | |
|---|---|---|---|---|
| 5,600,761 | A * | 2/1997 | Ng et al. | 345/418 |
| 5,852,678 | A * | 12/1998 | Shiau et al. | 382/176 |
| 5,872,864 | A * | 2/1999 | Imade et al. | 382/176 |
| 6,501,856 | B2 * | 12/2002 | Kuwano et al. | 382/194 |
| 6,633,670 | B1 * | 10/2003 | Matthews | 382/176 |
| 7,043,080 | B1 * | 5/2006 | Dolan | 382/199 |
| 2002/0085116 | A1 * | 7/2002 | Kuwano et al. | 348/465 |
| 2005/0002566 | A1 * | 1/2005 | Di Federico et al. | 382/176 |

OTHER PUBLICATIONS

Negi et al, Localization and extraction of text in telagu document images, Oct. 2003, Tencon 2003, 749-752 vol. 2.*
Lebourgeois (ed.), "Robust multifont OCR system from gray level images," *Proceedings of the Fourth International Conference on Document Analysis and Recognition,* vol. II, Aug. 18-20, 199, pp. 1-5.
Duong et al., "Extraction of text areas in printed document images," *DocEng 01,* Nov. 9-10, 2001, pp. 157-164.
Jung et al., "Support vector machines for text location in news video images," *Proceedings of IEEE Tencon 2000,* vol. 2 of 3, Sep. 24, 2000, pp. 176-180.

* cited by examiner

*Primary Examiner*—Brian P Werner
*Assistant Examiner*—Kathleen S Yuan
(74) *Attorney, Agent, or Firm*—Lowe Hauptman Ham & Berner LLP (57) ABSTRACT

Pixels are classified as text; or "non-text" by responding to accumulated luminous brightness gradients within a predetermined pixel interior. Text and non-text image characteristics rest on estimating text-containing rectangles by determining a narrow width and a height of a peak in an interval of accumulated gradients around each pixel. The text characteristics also are inferred by detecting character corners by quantifying and smoothing gradient angles and by associating directional corner responses with each pixel.

20 Claims, 6 Drawing Sheets

DETERMINING PIXELS TEXTUAL CHARACTERISTICS

RELATED APPLICATIONS

The related application is based on, and claims priority from, FR Application Number 0311918, filed on Oct. 10, 2003, the disclosure of which is hereby incorporated by reference herein in its entirety.

FIELD OF INVENTION

The present invention relates to determining text pixel characteristics in order to discriminate between text pixels and non-text images so as to detect text data present in images and in image sequences forming video sequences.

BACKGROUND ART

Text data detection assumes primary importance in many applications such as image indexing. Indexing such an image in general is resolved into four stages:
 detecting text data in the image, generally including a sub-stage of classification of the image's pixels,
 retrieving the detected text data,
 character recognition in the retrieved text data, and
 indexing the image as a function of the recognized text data.

In general the character recognition stage is carried out by an optical character recognition (OCR) system.

The text data contained in images are of two types, namely "scene text" or "artificial text". The artificial text is the text that was added to the original image, for instance a sub-title. The scene text is the text already contained in the original image, for instance that of advertising or of a T-shirt. The scene text is more difficult to detect than the artificial text because scene text has more complex characteristics, such as orientation, color and size of text fonts.

The text data detecting algorithms are more or less effective depending on the characteristics of the text which must be detected.

First text data detecting algorithms performed character segmentation before grouping the characters to detect words and lines. The purpose of segmentation is to divide an original image into several distinct zones.

Some text data detection algorithms are based on classifying image data line by line into "text" and "non-text" pixels. Illustratively a colorimetric grouping of pixels in each line is carried out to ascertain those pixels which belong to one "text" zone. Bar graphs of uniform color line segments are determined and compared to each other in order to form rectangles comprising image text.

In an embodiment variation, gradients of luminous brightness of each line are evaluated and the lines are considered in segments that exhibit a similar gray shade. The adjacent lines are merged according to a statistical similarity criterion.

In other variations, related image components are processed hierarchically in order to determine the text zones.

The text data detection algorithms based on segmentation are effective on high resolution images retrieved from newspapers, but their performance is much less for low resolution images wherein the characters touch each other and their font sizes are small.

Other text data detecting algorithms are based on contour detection and texture analysis. Some algorithms make use of the high contrast of the strokes forming text characters and seek out vertical contours which they group into rectangles. These text data detecting algorithms require an enhancing stage for the image retrieved from the rectangles before the character recognition stage can begin. For instance a stage for connecting image information into binary signals is carried out following contour grouping by evaluating gradients that were accumulated for each image pixel.

Other text data detecting algorithms are based on a learning process and sometimes resort to Haar wavelets to retrieve text characteristics from each pixel forming an image. By moving a fixed-size window over the image, wavelet coefficients are injected into a neuron network of the multilayer perception (MLP) type in order to classify each pixel as being "text" or "non-text".

In a variation, the neuron network classifies each image pixel as a function of contour density, of bar graph variance, etc.

In general the pixel classification as a function of text characteristics is carried out on neuron networks or on support vector machines (SVMs). These classifying means take into account the previous pixel classifications in order to classify the ensuing pixels and in this manner they "learn" to classify.

Other recent text data detecting algorithms act directly on compressed image shapes or on compressed video sequences, for instance on images having been compressed in the MPEG 1, MPEG 2 modes etc.

The text and non-text pixels do not lend themselves to be discriminated solely on the basis of the local text characteristics of the pixels of an image. The main text characteristics is of a text are retrieved from its geometry and are rendered by the presence of a baseline and by the feasibility of isolating the text by bounding a zone around it. A text's baseline refers to the alignment of the text's characters. Moreover, the text characteristics regarding texture become increasingly uncertain as the text being processed becomes shorter.

The objective of the present invention is to remedy the above drawbacks by determining more text characteristics of image pixels in order to detect text data in said images to improve the efficiency and accuracy of text data detection.

SUMMARY OF THE INVENTION

According to an aspect of the invention, a method of determining text characteristics for the purpose of discriminating between text and non-text image pixels comprises: (1) accumulating luminous intensity gradients in a first direction for each image pixel in accumulated gradients, (2) as regards each currently considered pixel, determining a pair of edges in a gradient of functions that are accumulated within a predetermined pixel interval running in a second direction perpendicular to the first; (the interval is centered on the current pixel and a peak height between the maximum value of the accumulated pixels and the average of the gradients accumulated at said edges for different values of the two edges respectively included within two halves of the predetermined pixel interval; and (3) discriminating between the text pixels and the non-text pixels (i.e. the mode of the pixels) on the basis of the considerable height and narrow widths of the determined pairs of edges of the pixels.

Pixel text characteristics other than the "mode" heights and widths that were previously determined, as discussed further below, such as the difference between gradients accumulated at the edges and the average of accumulated gradients between the given edges, are determined for each pixel in order to discriminate between the text pixels and the non-text pixels again as a function of the differences and the average of the accumulated gradients determined by the pairs of edges of the pixels.

More specifically, a pair of edges for each current pixel is determined as a function of a maximized variable depending on the width between the two edges, of minimum and maximum gradients accumulated in the predetermined interval, of the height between the maximum value of the accumulated gradients and the average of the accumulated gradients, and of the average of the accumulated gradients between the two edges, for different values of the two edges respectively included in the two halves of the predetermined interval.

Another text characteristic for discriminating between the text and non-text pixels is the presence of a text baseline. The text baseline is detected by summing the differences of narrow widths of pairs of pixels close to and along a window oriented in the first direction and of predetermined width.

In another embodiment of the present invention, which can combined with the determination of the above characteristics, the method of the invention is based on detecting character corners. Said method comprises the following stages for each pixel of said image:

(1) determining directional corner responses along four predetermined orientations, (2) quantifying a gradient angle respectively in four predetermined orientations, (3) smoothing the quantified gradient angle as a function of the quantified gradient angles and of pixel gradients near the pixel, and (4) allocating one of the directional corner responses to each pixel as a function of the angle of the smoothed pixel gradient.

The quantified gradient angle of each current pixel preferably is smoothed as a function of maximized sums of gradients of the pixels near the current pixel. The near pixels are respectively weighted and oriented along predetermined directions. As regards the sum of gradients for a respective predetermined orientation, there is preferably weighting for the current pixel, for pixels which are in the immediate vicinity along the first and second directions that are horizontally and vertically aligned with the current pixel and for near pixels along directions diagonal to the first and second directions, so the current pixel has the greatest weight, the pixels aligned along the first and second directions have an intermediate weighting and the diagram pixels have the least weighting.

The method of the invention also can include the following stages:

(1) allocating the largest of the directional responses associated with the current pixel and with the pixel preceding it along a predetermined path to each pixel, (2) accumulating the directional corner responses associated with each pixel and with the pixels near it along the first and second directions, (3) discriminating between the text and non-text pixels as a function of the accumulated directional corner responses.

Other characteristics and advantages of the present invention are elucidated in the following description of several preferred, illustrative and non-limiting embodiments of the present invention and in relation to the corresponding attached drawings.

DETAILED DESCRIPTION OF THE DRAWINGS

Figure 1:
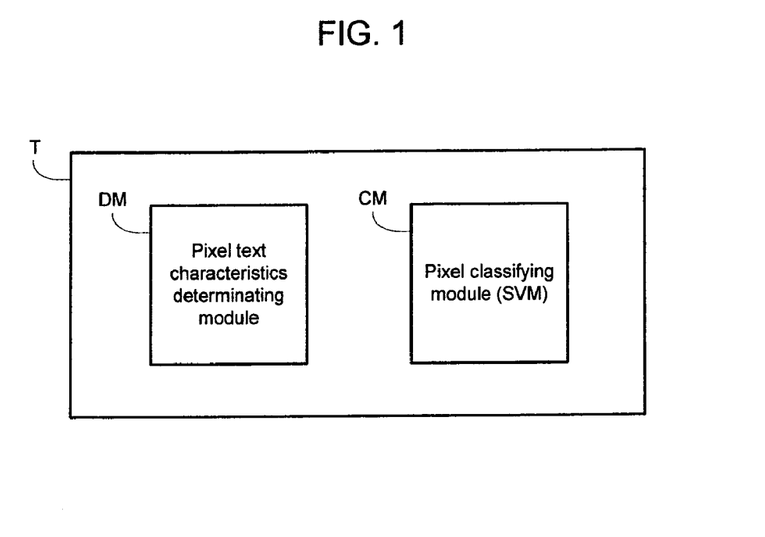
FIG. 1 is schematic diagram of an information processing system implementing the method of the invention for determining the text characteristics of the image's pixels.

An information processing system in the form of a data processing system implementing the method of the present invention of determining text characteristics mainly comprises a software module DM shown in FIG. 1 for determining pixel text characteristics of the image.

The information processing system is installed into a terminal T which in particular is a personal computer.

The information processing system already has received and stored at least one digital image or sequences of digital images forming a video sequence. Each image I is assumed to contain at least one text portion that is a part of the image and comprises text characters.

A method of detecting text information substantially comprises two main stages, a first stage for determining vectors of text characteristics of the image pixels and a second stage for classifying image pixels during which text pixels and non-text pixels are determined as a function of the determined text characteristic vectors.

The objective of the first stage is to determine sufficiently discriminatory text characteristics of the image pixels to classify the pixels as "textural" and "non-text" during the second stage. A pixel classified as "text" pixel is considered to belong to a text character and is called a "text pixel" to contrast it with an "non-text pixel". This first stage results in a text characteristics vector which is determined for each image pixel.

The objective of the second stage is to classify each pixel as a function of the text characteristic vectors that were determined by means of an algorithm such as one of the algorithms implemented in support vector machines (SVMs).

By convention, the horizontal direction is a first direction X which is considered parallel to the lines (rows) of pixels of a rectangular image and parallel to the large image sides, and the vertical direction is a second direction y which is considered parallel to the columns of pixels of the image and parallel to the small image sides.

According to another aspect of the present invention, an image text is modeled as a group of horizontally aligned, vertical strokes. This modeling entails two properties:
  (1) accumulation of luminous brightness gradients due to the grouping of strokes, and
  (2) a text's stroke ends in the same direction as the text itself regardless of horizontal, vertical or slanted text direction.

The first property is modeled by a text characteristic value by accumulating horizontal gradients in a window around each pixel.

The second property is modeled by two approaches which are respectively described below:
  (1) determining a first estimate of text-containing rectangles, further regularity and validity of the text's surface geometry, and
  (2) detecting character corners on the contour of a rectangle containing the text, that is a rectangle which is substantially the perimeter of the text, and propagating these corner characteristics within the text surface.

In the first embodiment mode of the present invention, a first coarse detection is carried out by determining a baseline of the text of the image I such as the ends of a high density surface within the image. The high density surface is the surface of the rectangle containing text within the image, that is, it substantially circumscribes the text.

Substantial difficulties are entailed in directly detecting a baseline by illustratively using the Hough transform because of the irregularity of the rectangles containing the text and any presence of a short text. Moreover boundaries between text and non-text zones may be blurry, especially when the text's direction does not coincide with the direction of the directional gradient filter. Illustratively a text oriented at fifteen degrees to the horizontal is detected less positively when using a horizontal gradient filter. As a result, direction detection of lines and contours raises a complex problem.

To remedy the complexity inherent in direct baseline detection, the method and apparatus of the present invention determines the height of any rectangle associated with a current pixel and compares the height differentials between the neighboring pixels and the current pixel. Within the text zones, the determined rectangle heights are assumed to remain approximately constant.

Figure 3:
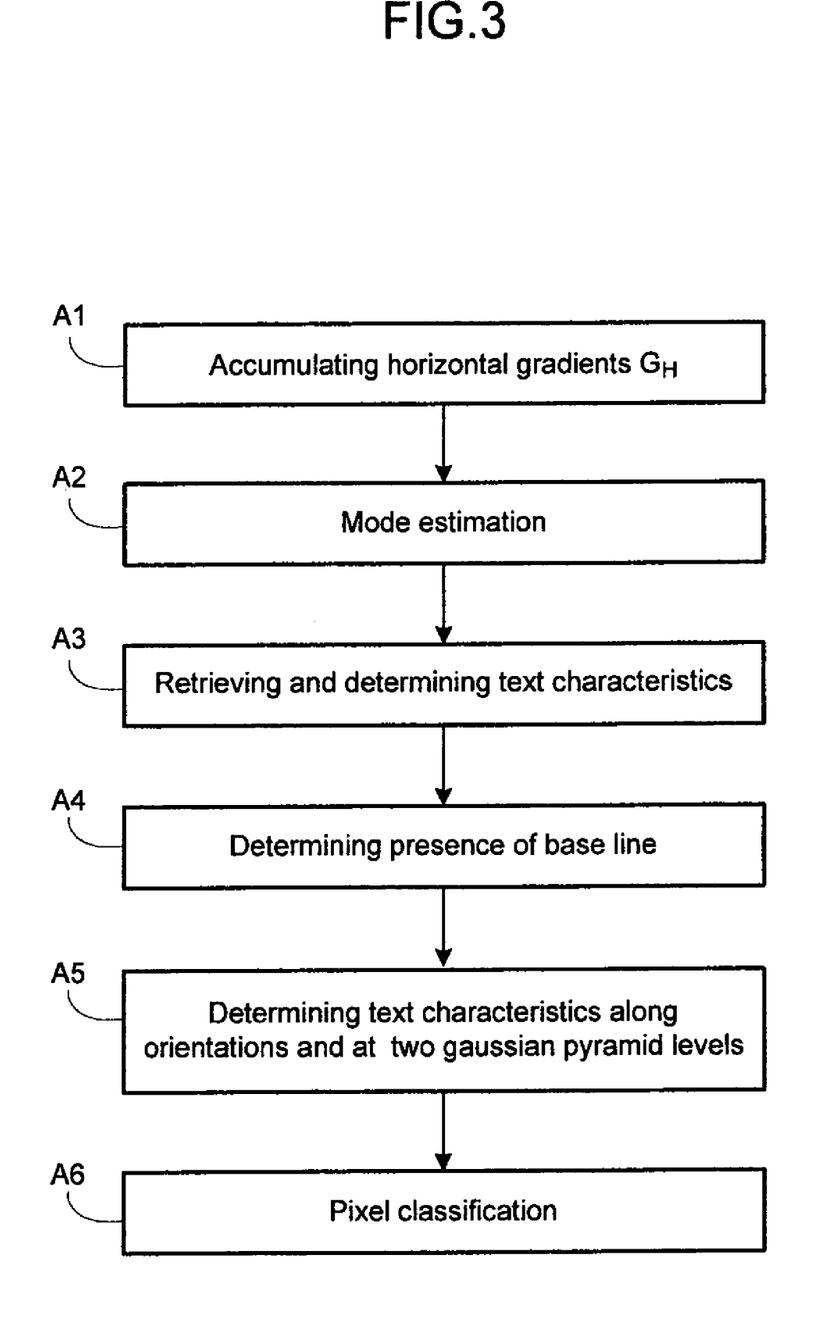
FIG. 3 is a flow diagram of an algorithm performed by the processing system of FIG. 1 for determining text characteristics based on estimated image pixel modes of a first preferred embodiment of the invention.

The algorithm of the mode-estimating method mainly comprises the stages A1 through A6 shown in FIG. 3 as the first preferred embodiment of the present invention.

Figure 2:
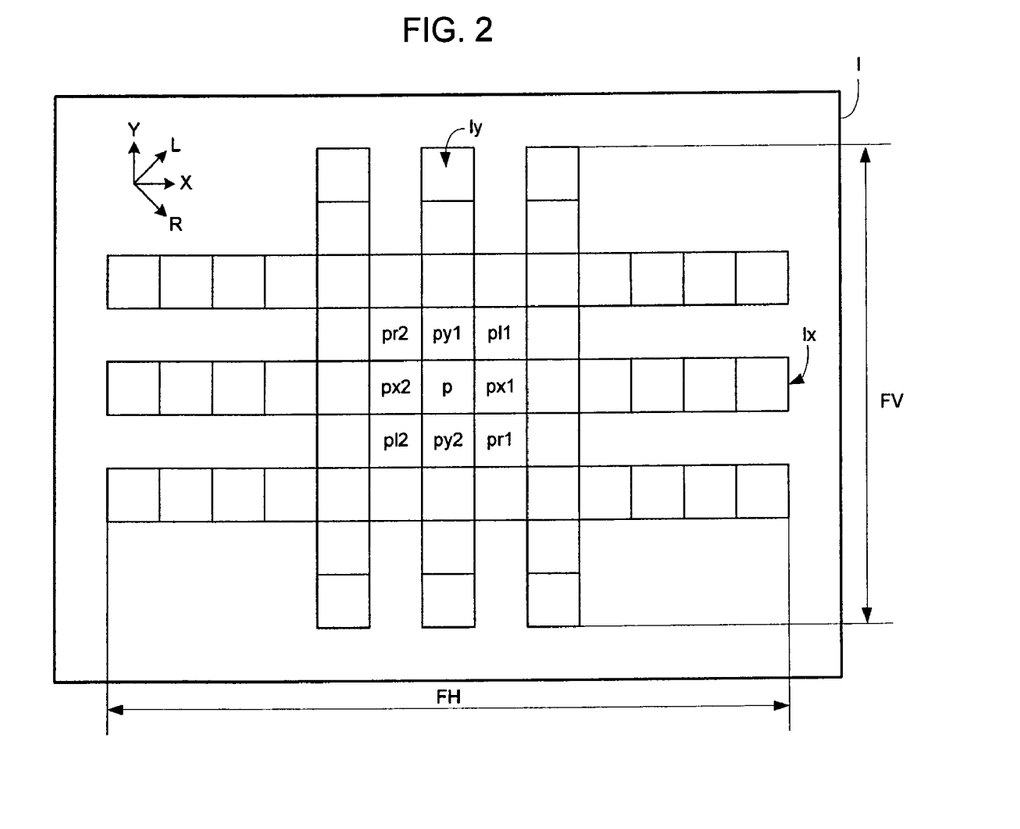
FIG. 2 is schematic diagram useful in deciding how to classify the gradient accumulation along two different directions.

In order to characterize the pixels of image I, the method and apparatus of the present invention employs the known principle of accumulating luminous brightness gradients because an image text pixel exhibits a large value gradient in stage A1. An accumulated horizontal gradient of a current pixel p having coordinates x and y in the image I is the sum of horizontal elementary gradients of luminous brightness, for instance the brightness of a pixel compared to the brightness of consecutive pairs of pixels on the image line lx of which pixel is a part and that are situated near the current pixel. For instance and as shown in FIG. 2, the current pixel p is associated with a horizontal gradient which is the sum of the twelve elementary horizontal gradients between the (2.times.6+1)=13 pixels on either side of the current pixel p, inclusive of the latter, in the image line lx. The characteristic determining module DM in this manner determines an accumulated horizontal gradient $G_H$ for each pixel of image I by summing the elementary horizontal gradients by means of a filter which filters the accumulated of elementary horizontal gradients. The filter has a response $G_H$ given by $$G_H(x, y) = \sqrt{\int_{-WH/2}^{+WH/2} \left[\frac{\partial I}{\partial x}\right]^2 dx}$$

where WH denotes the size of the windows of the elementary horizontal gradients being added, for instance there being 13 of them, and I denotes the brightness of image I. The value of the parameter WH depends on the sizes of the characters of the text to be detected and on image contrast.

The height of the rectangle containing the text of image I is determined from a vertical profile of the response of the horizontal gradient filter, that is, a vertical interval TV of N pixels centered on the pixel p is taken into account for each pixel on the long axis of the rectangle. The objective of the next stage A2 is to estimate—within the interval TV—a mode for pixel p at the center of the interval TV.

Figure 4:
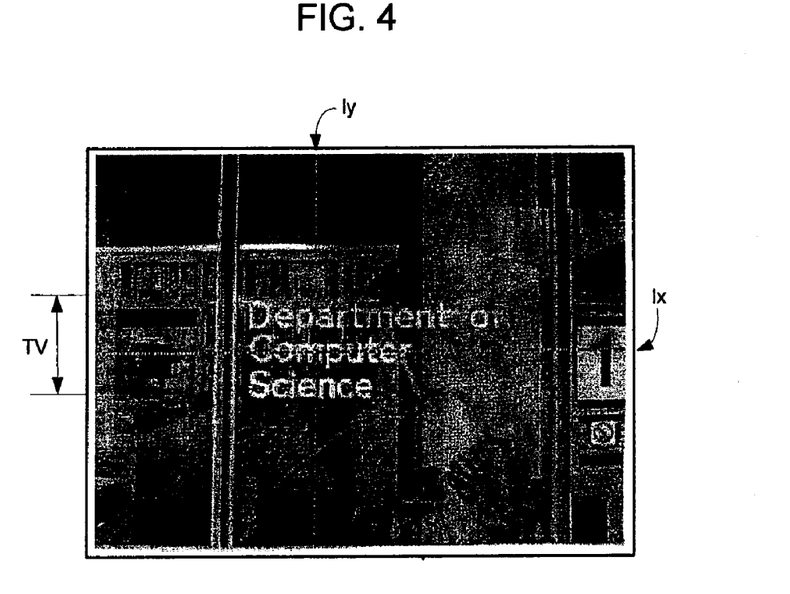
FIG. 4 is a representation of an original image indicating a pixel position by the intersection of two lines of the first embodiment mode.
Figure 5:
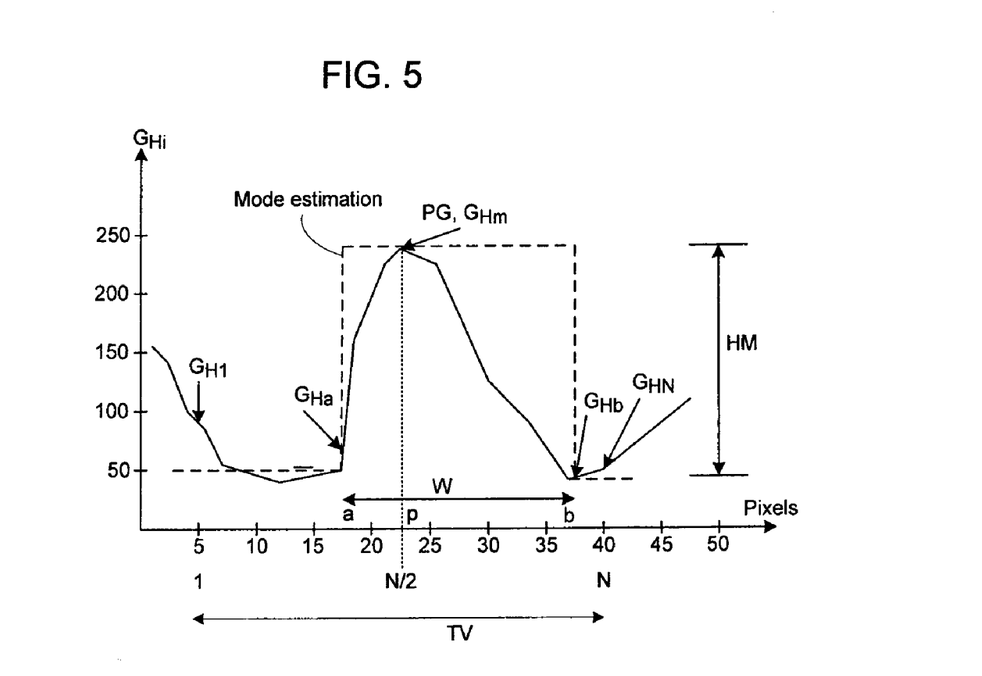
FIG. 5 is a plot of gradients accumulated horizontally into image pixels within a vertical interval, in a first embodiment mode.

FIG. 4 illustrates an original image wherein the height of the text-containing rectangle is estimated from the position of current pixel p indicated by the intersection of horizontal line lx and vertical line ly, said position being included in the text-containing rectangle. FIG. 5 is a curve of accumulated horizontal gradients $G_{Hi}$ of the pixels of the original image along the line ly and in particular in the vertical interval TV, a visible peak PG of accumulated horizontal gradients in the interval TV centered on the pixel p. The dashed line represents the mode estimate (i.e. text or non-text) of pixel p. The estimated mode substantially depends on the peak PG in the interval TV and on gradient values $G_{Ha}$ and $G_{Hb}$ at the ends a and b of an interval (a, b) defining the mode width.

The text orientation (i.e., horizontal, vertical or diagonal) affects the shape of the mode estimate over the vertical interval TV, that is the shape of the peak PG. When a horizontal gradient filter is used, horizontal text entails a mode estimate across the vertical interval TV of an essentially rectangular shape whereas a slightly diagonal text entails a mode estimate across the vertical interval TV assuming a trapezoidal shape and a lower peak amplitude.

Outside the vertical interval TV mode estimating is undefined. When the current pixel p is near non-text pixels, the horizontal gradients accumulated at the ends of the vertical interval TV are almost zero. The ends a and b of the mode interval are called the estimated mode edges. When the rectangle containing text is textured or comprises rectangles containing text near it, other accumulated horizontal gradient peaks are present in the vertical interval TV.

The following properties are employed in estimating a pixel mode:
  a horizontal gradient filter response which is considered substantial in the vertical interval of the estimated mode, typically when a gradient $G_{Hm}$ at the peak PG exceeds a predetermined gradient threshold,
  a substantial differential between the value of the maximum gradient $G_{Hm}$ of the mode estimated at the peak PG and the average gradient at the mode's edges a and b, said differential being called the height of the HM mode reflecting the contrast between the brightness of the pixel p and hence of the text and the pixels near the text rectangle, namely $HM = G_{Hm} - (G_{Ha} + G_{Hb})/2$,
  a mode width W which is the difference between the edge values of the estimated mode, b−a plus 1, expressed in number of pixels along the line lx and which is desired to be as narrow as possible in order to circumvent detecting neighboring, text-containing rectangles; the width of the mode W corresponds to the height of the rectangle containing the text of the level of the current pixel and therefore constitutes a text characteristic; this width W is the larger when the text is written more obliquely to the horizontal.

Assume the vertical interval TV contains N consecutive pixels of which the values of accumulated horizontal gradients are $G_{H1}$ through $G_{HN}$ and wherein the central pixel N/2 corresponds to the pixel p for which a mode must be estimated. The possible values of the edges a and b of the mode to be estimated and expressed as a number of pixels between 1 and N are in the following intervals:

a∈[1,N/2−1] and b∈[N/2+1,N].

The values a and b of the mode edges for the pixel to be estimated are between the ends to be estimated of the interval TV and are different from the central value N/2 corresponding to the pixel p. These values a and b are determined so a peak PG of accumulated horizontal gradients can be included in the interval (a, b) and the values of the accumulated gradients $G_{Ha}$ and $G_{Hb}$ at the edges of the interval (a, b) can be small.

The values a and b of the mode edges are estimated by maximizing the variable set forth in brackets in the following expression, that is by searching for an estimated mode having a large height HM and a small mode width W:

$$(a, b) = \operatorname*{argmax}_{a,b}\left[\alpha_1\left(1 - \frac{W}{N}\right) + \alpha_2\frac{HM}{\max(G_{Hi}) - \min(G_{Hi})} + \alpha_3\frac{\mu(G_i)}{\max(G_{Hi})}\right]$$

where:

$G_i$ is the accumulated horizontal gradient of pixel i in the interval TV, namely i∈[a,b]; illustratively, in FIG. 5, max $(G_{Hi})G_{Hm}$ at the peak and min$(G_{Hi})<G_{Hb}$;

W=b−a+1: mode width;

HM=max$(G_{Hi})$−$(G_{Ha})$+$G_{Hb})$/2, where i∈[a+1, b−1]: mode height;

$$\mu(G_i) = \sum_{i=a}^{i=b} G_i / (b - a + 1):$$

average of the mode gradient values in the (a,b) interval.

The coefficients $\alpha_1$, $\alpha_2$ and $\alpha_3$ are weighting coefficients and are empirically determined, namely as $\alpha_1$=0.25; $\alpha_2$,=1.0 and $\alpha_3$=0.5

Based on the above equation, once the mode has been estimated in stage A2 by the characteristic determining module DM, certain characteristics, already determined during stages A1 and A2, are retrieved for each pixel and others are determined by the module DM in stage A3 in order to globally ascertain the following characteristics of each pixel: mode width, mode height, average mode, mode standard deviation etc.

The module DM also determines, as a text characteristic, mode height differential |$G_{Ha}$−$G_{Hb}$| at the mode edges for each pixel of image I for the purpose of considering the local contrast in the vicinity of the text-containing rectangle.

By combining the estimated mode properties of several neighboring pixels, the character determining module DM also retrieves characteristics across an extended spatial zone.

The characteristic determining module DM checks, in stage A4, the variability of mode width along neighboring pixels which are aligned along several predetermined directions, for instance in a horizontal direction, and which are included in a horizontal window of predetermined width $S_w$. For the purpose of this check, the module DM determines the difference of the mode widths for each pair of neighboring pixels and accumulates, that is sums, the differences for all pairs of the window $S_w$ and derives an accumulated mode-width difference ΔW(x, y) representing the presence of a baseline in the horizontal direction and defined by:

$$\Delta W(x, y) = \sum_{i=-S_w/2}^{i=S_w/2} |W(x + i - 1, y) - W(x + i, y)|$$

where $S_w$ denotes the width of the horizontal window depending on the character size of the text, and W(x,y) denotes the mode width at the pixel having coordinates x and y.

The mode widths W are approximately uniform for pixels in text zones along the determined direction. The smaller the accumulated difference ΔW, the more accurately it shows that the predetermined direction, for instance horizontal, along which the pixel pairs are aligned is parallel to the baseline of the investigated text.

Figure 6A:
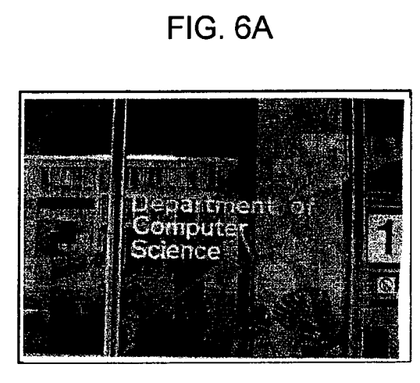
FIG. 6A is a representation of an original image.

FIG. 6A is a representation of an original image and FIGS. 6B through 6H are representations of images of characteristics that ensue from said original image. In these Figures, the values of text characteristics are each independently reset to scale in order to legibly display them.

Figure 6B:
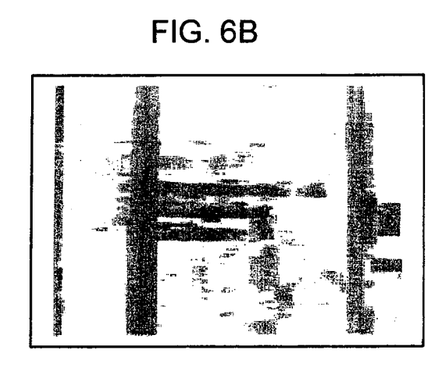
FIGS. 6B-6H are representations of illustrative images of characteristics resulting from the original image of FIG. 6A of the first embodiment mode.

FIG. 6B is a representation of an image of accumulated gradients for the pixels of the original image.

Figure 6C:
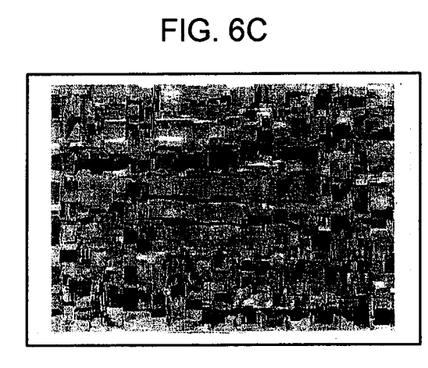

FIG. 6C is a representation of an image of the mode widths W for the pixels of the original image. The narrower the mode width, the darker the image and the more it corresponds to a text zone.

Figure 6D:
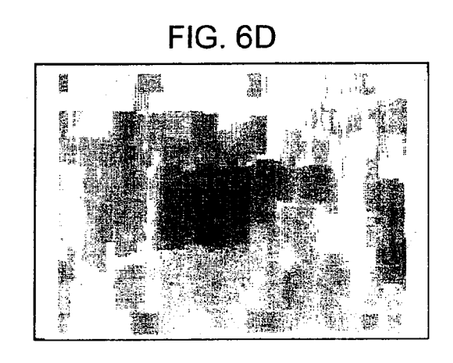

FIG. 6D is a representation of an image of the mode heights HM for the original image's pixels. The larger the mode height, the darker the image and the more it corresponds to a text zone.

Figure 6E:
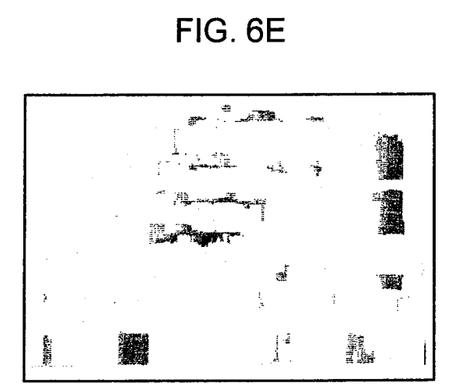

FIG. 6E is a representation of an image of the mode height differential |$G_{Ha}$−$G_{Hb}$| at the mode edges of the pixels of the original image. The smaller the mode height differential, the clearer the image and the more it corresponds to a text zone.

Figure 6F:
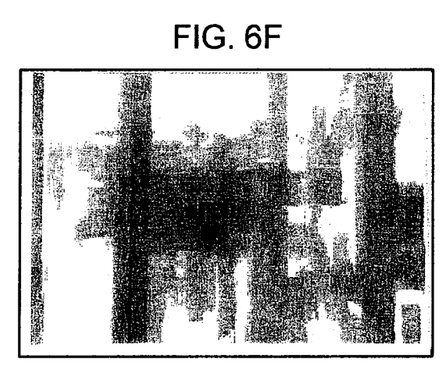

FIG. 6F is a representation of an image of the mode averages μ($G_i$) for the pixels of the original image. The higher the mode average, the darker the image and the more it corresponds to a text zone.

Figure 6G:
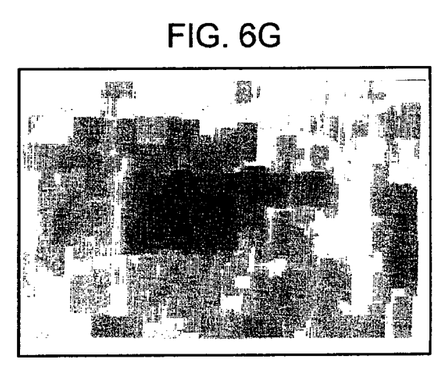

FIG. 6G is a representation of standard deviations of the pixels of the original image. The lower the standard deviation, the darker the image and the more it corresponds to a text zone.

Figure 6H:
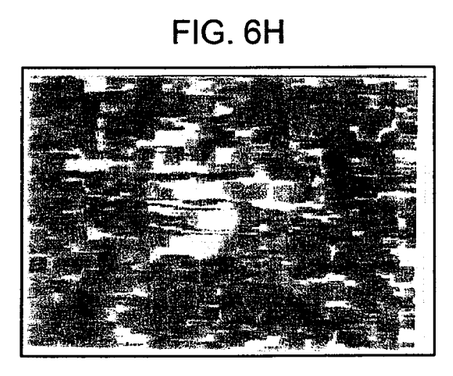

FIG. 6H is a representation of an image of the presence of a baseline of the pixel of the original image. The longer the baseline, the clearer the image and the more the image corresponds to a text zone.

The Table below lists seven values of final text characteristics corresponding to a unique orientation and to a level of a Gaussian pyramid. Therefore the seven text characteristics are determined in stage A5 along the four main orientations (X, Y, R, L) and at two Gaussian pyramid levels. The text characteristics of a pixel are grouped within a vector 7*4*2=56 text characteristics generated by the characteristic determining module DM.

The text characteristic vectors of the pixels of image I are determined to allow a pixel classifying software module CM to classify, in stage A6, each pixel into one of the two text or non-text classes and thereby to discriminate between the text and non-text pixels in the image. The CM module is included in terminal T as shown in FIG. 1. In the preferred embodiment of the present invention, the classifying module is a support vector machine SVM.

| VALUES | CHARACTERISTICS |
|---|---|
| 1 | Accumulated horizontal gradients $G_H$ |
| 1 | Mode width W |
| 1 | Mode height HM |
| 1 | Mode height differential at edges $|G_{Ha} - G_{Hb}|$ |
| 1 | Average of mode gradients $\mu(G_i)$ |
| 1 | Mode standard deviation |
| 1 | Baseline presence $\Delta W$ |

Two initial stages are required before the support vector machine can classify the pixels as a function of the text characteristics vectors, namely a sampling-based learning stage, and a generalization stage.

In the present invention, the samples are pixels. The learning stage includes manually determining the class of several pixels of an image in order that the support vector machine SVM can generalize its learning to automatically classify the pixels as a function of their text characteristics vectors.

In the present invention, the learning stage rests on the known approach of "bootstrapping". In order to estimate a generalization error, a cross-validation is carried out of N partitions of each of the two pixel text and non-text classes previously determined using the bootstrapping algorithm.

Figure 7:
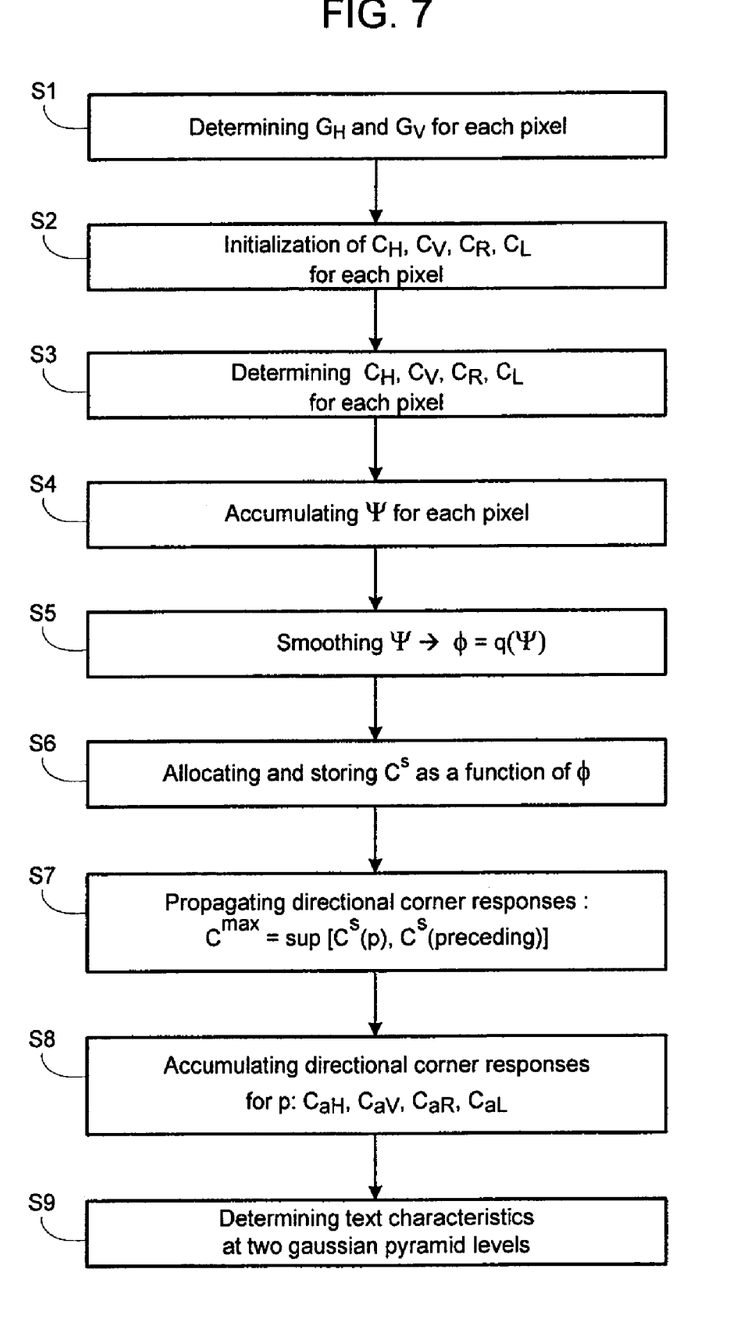
FIG. 7 is a flow diagram of an algorithm of the method performed by determining the data processing system of text characteristics based on detecting image character corners, in a second preferred embodiment of the invention.

In the preferred second embodiment mode the algorithm of the method of determining the text characteristics of the image pixels is based on detecting the corners of the text characters of the image and mainly comprises the stages S1 through S9 shown in FIG. 7.

The characteristic determining module DM detects the extreme points of the strokes of the characters of image I, which also are called character corners. The character corners are situated on the contour of the rectangle containing the text characters of image I.

Using the above described horizontal gradient filter of stage A1, the characteristic determining module DM ascertains, in stage S1, the accumulation of horizontal gradients of each pixel of image I in order to associate the accumulated horizontal gradient $G_H(x,y)$ as a text characteristic to the current pixel p.

The vertical gradient of an current pixel in image I is the sum of elementary vertical gradients having luminous brightness for consecutive pairs of pixels in the image column ly to which the current pixel p belongs and that are situated near pixel p. Illustratively, as shown in FIG. 2, the pixel p is associated with a vertical gradient which is equal to the sum of the eight vertical elementary gradients between the (2×4+ 1)=9 pixels on the sides of the pixel p, including p itself, in a vertical lineFV along the image column. In the same way that the horizontal gradients are accumulated, the vertical gradients of the pixels of image I are accumulated by a vertical elementary gradient accumulation filter having a response $G_v$ is given by $$G_V(x, y) = \sqrt{\int_{-FV/2}^{+FV/2} \left[\frac{\partial I}{\partial y}\right]^2 dy}.$$

Accordingly the gradients are accumulated by module DM for each pixel in the horizontal direction X and in the vertical direction Y.

Next the current pixel p is associated with six text characteristics values respectively equal to the three accumulated horizontal gradients of pixel p and its two immediate neighbors px1 and px2 along the direction X and to the three accumulated vertical gradients of pixel p and its two immediate neighbors py1 and py2 along the direction Y. The values of text characteristics sampled at three different sites for the direction X or Y per pixel lead to additional information about the height of such characters.

The present invention does not employ the known corner detectors because known corner detectors have non-linear responses that can be applied only with difficulty to thresholding.

On the other hand the present invention determines character corners by using derivative corner filters which define the directional corner responses C for each pixel of coordinates x, y, r, l as follows:

$$C_H = \frac{\partial}{\partial y}\left|\frac{\partial I}{\partial x}\right|, \ C_V = \frac{\partial}{\partial x}\left|\frac{\partial I}{\partial y}\right|, \ C_R = \frac{\partial}{\partial l}\left|\frac{\partial I}{\partial r}\right|, \ C_L = \frac{\partial}{\partial r}\left|\frac{\partial I}{\partial l}\right|.$$

In the above, $C_H$ represents the directional corner response in the horizontal direction and contributes to the subsequent detection of end points of vertical strokes, $C_V$ represents the directional corner response in the vertical direction Y and contributes to the subsequent detection of end points of horizontal strokes, and $C_R$ and $C_L$ represent directional corner responses along diagonal directions R and L and contribute to the subsequent detection of end points in the diagonal direction.

The directional corner responses $C_H$, $C_V$, $C_R$ and $C_L$ offer the advantage of easy application of thresholding.

Based on an initial hypothesis of the text characters of image I lacking any corner, the characteristic determining module DM in stage S2 initializes to zero the directional corner responses $C_H$, $C_V$, $C_R$ and $C_L$ of each image pixel.

The characteristic determining module DM in stage S3 determines the directional corner responses $C_H$, $C_V$, $C_R$ and $C_L$.

The corner text characteristics are propagated to all image pixels within the rectangle containing the text to scatter the directional corner response images in the direction of the directions of the gradients of the images inside the rectangle containing the text. A space Θ having four discrete orientations is now considered:

Θ={X, Y, R, L} where X Y,R and L respectively denote horizontal, vertical, right and left diagonal orientations.

In stage S4, the characteristic determining module DM ascertains the angles of the pixel gradients of image I that are defined by:

$$\psi = \arg[\nabla I(x, y)] = \arctan\left(\frac{\left(\frac{\partial I(x, y)}{\partial x}\right)}{\left(\frac{\partial I(x, y)}{\partial y}\right)}\right)$$

where $\nabla I(x,y)$ represents the gradient for a pixel p having coordinates x, y, r, I and has a modulus $$\|\nabla I(x, y)\| = \sqrt{\left(\frac{\partial I(x, y)}{\partial x}\right)^2 + \left(\frac{\partial I(x, y)}{\partial y}\right)^2}$$

The gradient angle of a pixel p is quantified as $q(\psi)$ as shown below:

$$\phi = q(\psi) = \begin{cases} X \text{ if } \psi \in \left[-\frac{\pi}{8}, \frac{\pi}{8}\right] \\ R \text{ if } \psi \in \left[-\frac{3\pi}{8}, -\frac{3\pi}{8}\right] R \text{ if } \psi \in \left[-\frac{3\pi}{8}, -\frac{3\pi}{8}\right] \\ Y \text{ if } \psi \in \left[-\frac{\pi}{2}, \frac{3\pi}{8}\right] \text{ where } \phi \in \left[\frac{3\pi}{8}, -\frac{\pi}{2}\right] \\ L \text{ if } \psi \in \left[\frac{\pi}{8}, \frac{3\pi}{8}\right] \end{cases}$$

In order to model corner characteristic propagation, the quantified gradient angle of each pixel p in stage S5 is smoothed using the values of the gradients of eight neighboring pixels. In FIG. 2, the neighboring pixels of the current pixel p are denoted by px1 and px2 in the X direction, by py1 and py2 in the Y direction, by pr1 and pr2 in the R direction and by pl1 and pl2 in the L direction.

A bar graph of the quantified gradient angles in terms of the four discrete orientations tracks the number of pixels for each orientation ($\phi \in \theta$) in the vicinity of each pixel p in order to sum neighboring and weighted pixel gradients which are oriented in each orientation. The smoothed gradient angle $\phi$ results from maximizing the sums of weighted gradients as follows:

$$\phi_s = \arg\max_{\substack{(i \in neighbors \text{ and } p) \\ \phi' \in \Theta}} \delta_{\phi', \phi^i} W_i \|\nabla I_i\|$$

where $\delta_\phi, \delta_{\phi i}$ denotes the Kronecker product defined by:

$\delta_\phi, \delta_\phi = 1$ if the quantified angle of the neighboring pixel I (such as px1, px2, py1, py2, pr1, pr2, pl1 or pl2, of the current pixel) corresponds to the direction $\phi$ which may be X, Y, L or R; otherwise, $\delta_\phi, \delta_\phi = 0$.

$W_i$ represents a weighting coefficient in a Gaussian weighting mask defined by the square matrix:

$W = [1\ 2\ 1]^T \otimes [1\ 2\ 1]$.

The weighting coefficient $W_i$ is 4 for the current pixel p. The weighting coefficients $W_i$ for the pixels px1, px2, py1 and py2, which are immediately next in the directions X and Y, are each 2. The weighting coefficients $W_i$ for the other four neighboring pixels, namely pr1, pr2, pl1 and pl2, in the directions which are diagonal to the directions X and Y, are each 1 and hence less than the weighting coefficients of the immediately adjacent pixels. This is because pr1, pr2, pl1 and pl2 are farther away from the current pixel and are statistically less predominant than px1, px2, py1 and py2 in the conventional directions of text writing in images.

$\|\nabla I_i\|$ represents the gradient modulus of one of nine pixels px1 through pl2.

Accordingly, in stage S6, the determination module DM associates one of the four discrete orientations $C^s$ to the current pixel p when the direction of the smoothed gradient angle $\phi = \phi(\psi)$ belongs to the angular interval associated with said orientation. For instance when $\phi_s = X$ for the current pixel p, then the directional response of this pixel is $C^s = C_H$; when $\phi_s = Y$ for pixel p, then its directional response is $C^s = C_V$. In stage S6, a memory within the characteristic determining module DM stores the directional corner responses respectively associated with the pixels of image I.

The directional corner responses associated with the pixels are propagated in the directions of the orientation respectively assigned to the gradient angles of the pixels along a predetermined path inside the text-containing rectangle. The predetermined path depends on the maximum font size of the text characters of image I. The maximum font size of the character is estimated beforehand as a function of the nature of the image I to be processed. In stage S7, the characteristic determining module DM thereupon selects the largest value $C^{max}$ of the directional corner responses associated with the current pixel p and with the pixel that precedes the current pixel p along the predetermined path when these two responses are associated with the same direction.

In stage S8 and in the same manner as for an accumulated gradient $G_H$, $G_V$ of the current pixel, the directional corner responses allocated to the neighboring pixel in stage S7 are accumulated in at least the assumed text direction in an accumulated response $C_a$. The accumulated response $C_a$ comprises two components $C_{aH}$ and $C_{aV}$ in the horizontal and vertical directions H and V respectively. Illustratively the response $C_{aH}$ is accumulated in the assumed text direction, in this case X, the directional corner responses which are maximized and allocated $C^{max}$ to the (2×6+1)=13 pixels on the sides of the current pixel, including the latter, in stage S7, being oriented in the direction X; in a similar manner, the response $C_{aV}$ is accumulated in the Y direction in order to attain the accumulated response of the two components for pixel p.

At this point, the current pixel's text characteristics are therefore the four components $G_H$, $G_V$, $C_{aH}$ and $C_{aV}$.

The characteristics of the pixels are determined in stage S9 at two levels of a Gaussian pyramid, that is for two rectangles of different sizes, in order to take into account the peak variability of the font size of the text characters. Each pixel in a pyramid level is classified by taking into account the information retrieved from the immediately neighboring of the current pixels (pixels px1 and px2, py1 and py2) respectively, in the horizontal direction H and in the vertical direction V. The text characteristics of the pixels are grouped into a text characteristic vector having a size 2*(3*4)=24. The components of this vector at one pyramid level are indicated in the Table below:

| Number of values | Characteristic |
|---|---|
| 3 | horizontally accumulated gradients $G_H$ for p, px1, px2 |
| 3 | vertically accumulated gradients $G_V$ for p, py1, py2 |
| 3 | horizontally accumulated corner responses $C_{aH}$ for p, px1, px2 |
| 3 | vertically accumulated corner response $C_{aV}$ for p, py1, py2 |

Next the pixel classification module CM discriminates between the text and non-text pixels as a function of the above determined text characteristics vectors.

The invention claimed is:

1. A method performed in a computer arrangement for determining text characteristics of pixels to discriminate between text pixels and non-text pixels of an image, comprising steps performed in said computer arrangement of:

using a computer to carry out the steps of:

accumulating luminous brightness gradients in a first direction for each image pixel into accumulated gradients, for each current pixel, determining a pair of edges as a function of the accumulated gradients for a predetermined pixel interval extending in a second direction perpendicular to the first direction and centered on the current pixel, thereby seeking to attain a peak height between and including a maximum value of the accumulated gradients and an average of the accumulated gradients at said edges and to attain a narrow width between said edges for different values of said edges respectively included in a pair of the predetermined pixel intervals; and discriminating between text pixels and non-text pixels as a function of the peak heights and narrow widths for the determined pairs of edges of the pixels of said image.

2. The method of claim 1, wherein the step of discriminating between the text pixels and the non-text pixels includes a step performed in said computer arrangement of determining the differential of the accumulated gradients at the edges determined for each current pixel.

3. The method of claim 2, wherein the step of discriminating between the text pixels and the non-text pixels further includes a step performed in said computer arrangement of determining an average of the accumulated gradients accumulated between the edges determined for each current pixel.

4. The method of claim 3, wherein the function which determines the pair of edges for each current pixel is further derived in said computer arrangement as a function of (a) a maximum of a variable dependent on said narrow width between said edges, (b) minimum and maximum accumulated gradients in the predetermined pixel interval, (c) the peak height between the maximum value of the accumulated gradients and the average of said accumulated gradients, and (d) the average of the accumulated gradients between said edges, for different values of two edges respectively in the two halves of the predetermined pixel interval.

5. The method of claim 4, wherein the step of discriminating between the text pixels and the non-text pixels includes a step performed in said computer arrangement of summing differentials of narrow widths of neighboring pixels along a window oriented in the first direction and of predetermined width into a sum representing the presence of a text baseline.

6. The method of claim 5, wherein the step of discriminating between the text pixels and the non-text pixels includes for each current pixel of the image steps performed in said computer arrangement of:

determining directional corner responses in four predetermined orientations relative to the current pixel, quantifying a brightness gradient angle relative to the four predetermined orientations into a quantified gradient angle, smoothing the quantified gradient angle as a function of the quantified gradient angles and of brightness gradients of pixels adjacent to the current pixel into a smoothed gradient angle, and associating one of the directional corner responses with said current pixel as a function of the smoothed gradient angle of the current pixel.

7. The method of claim 6, wherein the quantified gradient angle of each current pixel is smoothed is in the computer arrangement as a function of maximized sums of brightness gradients of the pixels that are near the current pixel and that are respectively weighted and oriented in the four predetermined orientations by the computer arrangement.

8. The method of claim 7, wherein a sum of brightness gradients for a respective predetermined orientation includes weighting, in the computer arrangement, brightness gradient coefficients for (a) the current pixel, (b) immediately neighboring pixels along the first and second directions, and (c) neighboring pixels along directions which are diagonal to the first and second directions.

9. The method of claim 8, wherein the current pixel has greatest weighting, the diagonal neighboring pixels have least weighting and the neighboring pixels along the first and second directions have an intermediate weighting.

10. The method of claim 8, further comprising steps performed in said computer arrangement of:

associating the largest of the directional corner responses related both to the current pixel and to a pixel preceding said current pixel with each pixel along a predetermined path;

accumulating directional corner responses associated with each pixel and with the pixels neighboring said each pixel along the first and second directions into accumulated directional corner responses, and discriminating between the text pixels and the non-text pixels as a function of said accumulated directional corner responses.

11. The method of claim 1, wherein the step of discriminating between the text pixels and the non-text pixels further includes a step performed in said computer arrangement of determining an average of the brightness gradients accumulated between the edges determined for each current pixel.

12. The method of claim 11, wherein the function which determines the pair of edges for each current pixel is also derived, by the computer arrangement, as a function of (a) the maximum of a variable dependent on said narrow width between said edges, (b) minimum and maximum accumulated gradients in the predetermined pixel interval, (c) the peak height between the maximum value of the accumulated gradients and said average of the accumulated gradients, and (d) the average of the accumulated gradients between said edges, for different values of said edges respectively in the halves of the predetermined pixel interval.

13. The method of claim 1, wherein the step of discriminating between the text pixels and the non-text pixels includes a step performed in said computer arrangement of summing differentials of narrow widths of neighboring pixels along a window oriented in the first direction and of predetermined width into a sum representing presence of a text baseline.

14. The method of claim 1, wherein the step of discriminating between the text pixels and the non-text pixels includes, for each current pixel of the image, steps performed in said computer arrangement of:

determining directional corner responses in four predetermined orientations relative to the current pixel, quantifying a brightness gradient angle relative to the four predetermined orientations into a quantified gradient angle, smoothing the quantified gradient angle as a function of the quantified gradient angles and of brightness gradients of pixels adjacent to the current pixel into a smoothed gradient angle, and associating one of the directional corner responses with said current pixel as a function of the smoothed gradient angle of the current pixel.

15. The method of claim 14, wherein the quantified gradient angle of each current pixel is smoothed, by the computer arrangement, as a function of maximized sums of brightness gradients of the pixels that are near the current pixel and that are respectively weighted and oriented in the four predetermined orientations.

16. The method of claim 15, wherein the for brightness gradients for a respective predetermined orientation are summed, by the computer arrangement, and the sum includes weighting brightness gradient coefficients for (a) the current pixel, (b) immediately neighboring pixels along the first and second directions, and (c) neighboring pixels along directions which are diagonal to the first and second directions.

17. The method of claim 16, wherein the current pixel has greatest weighting, the diagonal neighboring pixels have least weighting and the neighboring pixels along the first and second directions have an intermediate weighting.

18. The method of claim 14, further comprising steps performed in said computer arrangement of:

associating the largest of the directional corner response related both to the current pixel and to a pixel preceding said current pixel with each pixel along a predetermined path;

accumulating directional corner responses associated with each pixel and with the pixels neighboring said each pixel along the first and second directions into accumulated directional corner responses, and discriminating between the text pixels and the non-text pixel as a function of the accumulated directional corner responses.

19. An apparatus for determining text characteristics of pixels to discriminate between text pixels and non-text pixels of an image, comprising:

means for accumulating luminous brightness gradients in a first direction for each image pixel into accumulated gradients, for each current pixel, means for determining a pair of edges as a function of the accumulated gradients for a predetermined pixel interval extending in a second direction perpendicular to the first direction and centered on the current pixel, thereby seeking to attain a peak height between and including a maximum value of the accumulated gradients and an average of the accumulated gradients at said edges and to attain a narrow width between said edges for different values of said edges respectively included in a pair of the predetermined pixel interval; and means for discriminating between text pixels and non-text pixels as a function of peak heights and narrow widths for the determined pairs of edges.

20. A computer-readable tangible storage medium or a computer-readable storage device storing a program for causing a computer arrangement to perform the steps of claim 1.

* * * * *